(No Model.)
J. D. JONES.
METHOD OF EXTRACTING OLEAGINOUS MATTER FROM ANIMAL AND VEGETABLE SUBSTANCES.
No. 271,859. Patented Feb. 6, 1883.
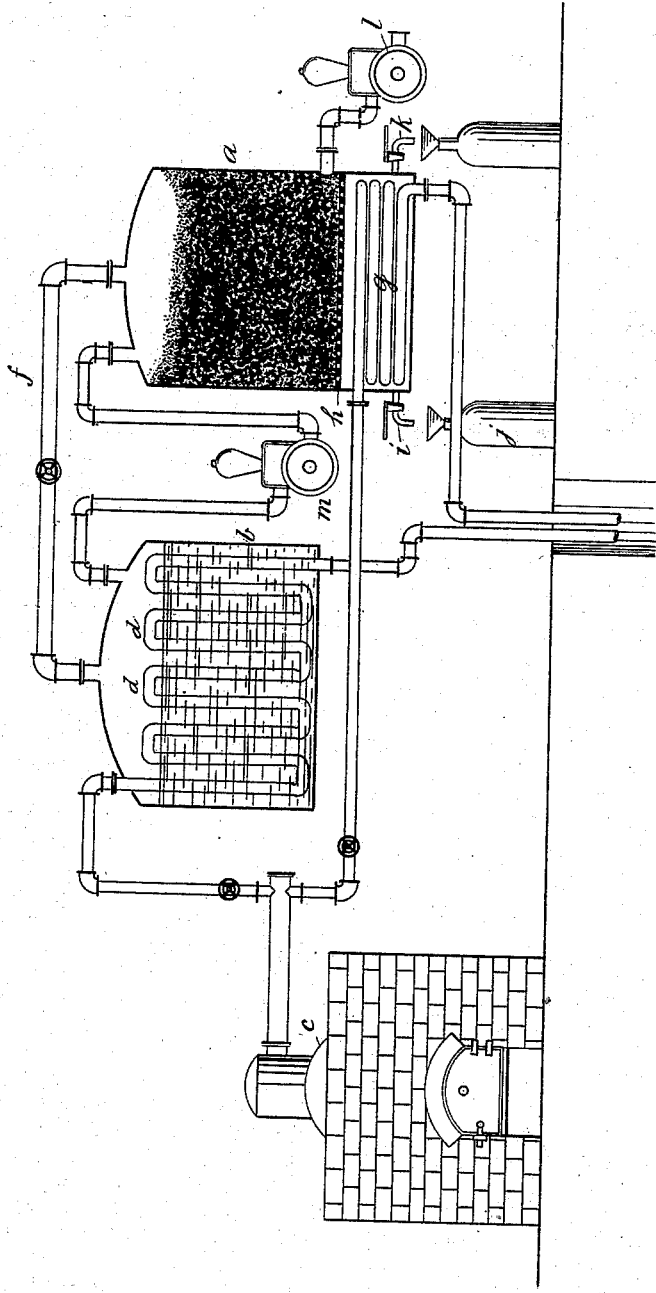
WITNESSES:
INVENTOR
BY
ATTORNEY

United States Patent Office.

JOSEPH D. JONES, OF BROOKLYN, ASSIGNOR TO WALTER T. LAWTON, OF NEW YORK, N. Y.

METHOD OF EXTRACTING OLEAGINOUS MATTER FROM ANIMAL AND VEGETABLE SUBSTANCES.

SPECIFICATION forming part of Letters Patent No. 271,859, dated February 6, 1883.

Application filed October 19, 1882. (No model.)

*To all whom it may concern:*

Be it known that I, JOSEPH D. JONES, a citizen of the United States, and a resident of Brooklyn, in the county of Kings and State of New York, have invented a new and Improved Method of Extracting Oleaginous Matter from Animal and Vegetable Substances, of which the following is a specification.

My invention relates to the method of extracting oleaginous, fatty, and other matters from animal-scrap, linseed, and cotton-seed, and like substances by the use of naphtha or other light hydrocarbon vapors; and it consists of the treatment of the residual products by fresh air subsequently to the removal of the naphtha-vapors employed, and the steam generated in the rendering process for sweetening and purifying the said products to render them more fit for animal food, the said treatment consisting in forcing air into the rendering-vessel containing the previously-treated matters and subjecting them to fresh compressed air for a time, then exhausting the air by allowing it to escape, and by the use of a pump to create a vacuum or partial vacuum, by which the vapors and odors of the naphtha and other noxious gaseous matters will be much more effectually removed, and the food products will be much sweeter and healthier than by any method now employed, all as hereinafter fully described, reference being made to the accompanying drawing, which is an elevation of apparatus that may be used in carrying out my invention; but as it may be accomplished by different forms or arrangements of the apparatus, I do not limit myself to any particular arrangement.

*a* represents the tank in which the matters to be treated for the separation of the oily substances are to be placed, said tank being suitably constructed for inclosing the same, so as to be treated by the vapor of naphtha or other volatile hydrocarbon generated in the vessel *b* by the heat of steam from the boiler *c*, circulating therethrough by the coil *d*, the vapor being delivered into the tank *a* by the pipe *f*. The tank *a* contains a heating-coil, *g*, as is usually employed in such apparatus, for heating the substances under treatment by steam from the boiler preparatory to the application of the naphtha-vapor, and there is a perforated bottom, *h*, over the coil for the support of the matters to be treated, through which the steam ascends to act on them.

The oily matters extracted may be drawn off through the cock *i* into any suitable receptacle, *j*, and the condensed hydrocarbon may be taken out through the same or another cock, *k*, to be returned to the vessel *b*, for being used again, if desired.

After the application of the hydrocarbon vapor for the separation of the oily matters, and subsequently to their discharge, as in the common practice, I propose to charge the matters remaining in the tank *a* with atmospheric air by means of a pump, *l*, for the separation of the odors of the naphtha, the air being compressed and thereby made to penetrate the mass for the more effectual action throughout the same. Then, after allowing the compressed air to remain a short time, I discharge the same, and with the aid of a vacuum-pump, *m*, exhaust the tank and create a vacuum therein, preferably discharging the air charged with vapor from the tank into the naphtha-vessel *b* for recovering the vapor therein. By this method I can effectually remove the taste and smell of the hydrocarbon vapors from the cakes, making much sweeter and healthier food for cattle than has been heretofore made.

It is to be noted that my improved process is not simply the use of a pump for withdrawing the naphtha-vapors for the purpose of discharging them, but is the treatment subsequent thereto of the residual matters, first by compressed air and then by rarefaction of the air in the tank.

Having thus described my invention, what I claim, and desire to secure by Letters Patent, is—

The method of purifying the residual products of vegetable and animal substances, treated with naphtha-vapors for the separation of oily matters and removing the naphtha odor from said residual products by charging the same with compressed air subsequently to drawing off the condensed vapors of naphtha and then exhausting the air and exposing said matters in vacuum, substantially as described.

In testimony whereof I have hereunto signed my name in the presence of two subscribing witnesses.

JOSEPH D. JONES.

Witnesses:
W. J. MORGAN.
A. P. THAYER.